(12) United States Patent
Campagna et al.

(10) Patent No.: US 10,845,146 B2
(45) Date of Patent: *Nov. 24, 2020

(54) FIREARM SAFETY SYSTEM

(71) Applicants: Jerry L. Campagna, San Jose, CA (US); Ethie T. Campagna, San Jose, CA (US)

(72) Inventors: Jerry L. Campagna, San Jose, CA (US); Ethie T. Campagna, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,722

(22) Filed: Jan. 5, 2019

(65) Prior Publication Data
US 2019/0212087 A1 Jul. 11, 2019

Related U.S. Application Data

(63) Continuation of application No. 15/645,230, filed on Jul. 10, 2017, now Pat. No. 10,175,018.

(51) Int. Cl.
| | |
|---|---|
| *F41A 17/06* | (2006.01) |
| *H04N 5/247* | (2006.01) |
| *G06K 9/62* | (2006.01) |
| *G06K 9/00* | (2006.01) |
| *H04N 5/225* | (2006.01) |

(52) U.S. Cl.
CPC ........ *F41A 17/066* (2013.01); *G06K 9/00255* (2013.01); *G06K 9/00268* (2013.01); *G06K 9/00288* (2013.01); *G06K 9/6202* (2013.01); *H04N 5/2256* (2013.01); *H04N 5/2257* (2013.01); *H04N 5/2258* (2013.01); *H04N 5/247* (2013.01)

(58) Field of Classification Search
CPC .. F41A 17/066; H04N 5/2257; H04N 5/2258; H04N 5/2256; H04N 5/247; G06K 9/00288; G06K 9/00268; G06K 9/00255; G06K 9/6202
See application file for complete search history.

(56) References Cited

U.S. PATENT DOCUMENTS

| | | | |
|---|---|---|---|
| 9,803,942 B2* | 10/2017 | Milde, Jr. | F41A 17/066 |
| 2017/0010062 A1* | 1/2017 | Black | G01S 5/0027 |
| 2017/0284754 A1* | 10/2017 | Chakraborty | H04N 5/232 |
| 2017/0286654 A1* | 10/2017 | Nicoll | G06F 21/32 |

* cited by examiner

*Primary Examiner* — Joshua T Semick
(74) *Attorney, Agent, or Firm* — Lincoln Law School of San Jose

(57) ABSTRACT

A firearm safety system processes images of a shooter and/or a target, and determines whether to lock or unlock a firearm based on a result of the processing. An image capturing device mounted on the firearm captures images of a shooter and a target. A storage media includes images of authorized users of the firearm, and images of targets not be shot at ("do-not-shoot" targets). A microprocessor compares the shooter image with images of the authorized users, and/or the target images with images of the do-not-shoot targets. The firearm is locked when (a) the shooter image does not match an image of any authorized user or (b) the target image matches an image of any do-not-shoot target. The firearm is unlocked when (a) the shooter image matches an image of any authorized users and (b) the target image does not match an image of any do-not-shoot target.

15 Claims, 5 Drawing Sheets

FIREARM SAFETY SYSTEM

RELATED APPLICATIONS

The present application claims priority to U.S. application Ser. No. 15/645,230, entitled "FIREARM SAFETY SYSTEM", filed on Jul. 10, 2017, the entire contents of which are incorporated herein by reference.

TECHNICAL FIELD

Several of the disclosed embodiments relate to safety devices for firearms, and more particularly, to lock and unlock trigger of the firearm.

BACKGROUND

There are many firearm safety devices available in the market. Generally, those kinds of devices prevent unwanted or accidental shooting of firearms. Few firearms have the firearm safety device as a built-in system while others have it as an aftermarket item that is installed on the firearm. Firearm safety system is one type of aftermarket retrofit to existing firearm safety device and a manufacturing component for new weapon regardless of the firearm design. It can be tailored to and utilized on all types of firearms: pistols, rifles, shot guns, and machine guns. Traditional firearm uses a keyed lock or biometric lock, for example, fingerprint recognition. The trigger cannot be pulled unless a person is identified as an authorized person, i.e., a person with a key, inserts the key into a keyhole and unlocks the device, or a person whose fingerprint is recognized by the biometric system.

The drawback of the current locking mechanism is that only one person can operate firearm. Also, it does not prevent the accidental shooting or misuse of firearm. Further, it does not prevent to use firearm against self to do suicide.

Incidents of accidental shooting can include usage of the firearm against kids, own family member, shooting self and shooting of a policeman by a criminal.

SUMMARY

Technology is disclosed for a firearm safety system ("the technology"). Various embodiments of the technology include (a) an image processing system that processes images of a shooter and/or a target, and (b) an activating mechanism that determines whether to lock or unlock the firearm based on a result of the processing. The images can be captured by an image capturing device, e.g., a camera, mounted on a barrel of the firearm. In some embodiments, the image processing system processes an image by comparing images captured from a first camera (referred to as a "front camera") and a second camera (referred to as a "back camera") with a set of images available from a storage media. For example, when a firearm is used to shoot the target, the front camera can capture one or more images of the target (referred to as a "target image") and the back camera can capture one or more images of the shooter (referred to as a "shooter image"). In some embodiments, a microprocessor in the firearm safety system processes one or more images captured by the camera. The microprocessor can be configured to process the images using image recognition software.

In some embodiments, a set of pre-loaded images are stored in an electronic storage media. The set of pre-loaded images can include a first group of images of authorized users of the firearm, e.g., authorized shooters, and a second group of images of people or targets who should not be shot at (referred to as "do-not-shoot" targets). The microprocessor compares the shooter image with the first group of images, and/or the target images with the second group of images. The firearm is locked when (a) the shooter image does not match any of the pre-loaded images of authorized users of the firearm or (b) the target image matches one or more of the pre-loaded image of the do-not-shoot targets. The firearm is unlocked when (a) the shooter image matches any of the pre-loaded images of the authorized users and (b) the target image does not match any of the pre-loaded images of the do-not-shoot targets. Only when the two safety criteria are met, i.e., a recognized shooter and a non-recognized target, will the firearm be enabled for firing.

In some embodiments, a rechargeable power supply is installed on the firearm, which supplies the power to the microprocessor. In some embodiments, a flashlight attached to the image-capturing device can be turned on during the night time to capture images.

The image capturing device can be a digital camera or a 360-degree rotating digital camera.

In some embodiments, an image processing software such as facial recognition or iris recognition software can be installed in the microprocessor to process the images with the set of pre-loaded images.

DETAILED DESCRIPTION

Technology is disclosed for a firearm safety system ("the technology"). Various embodiments of the technology include a) an image processing system that processes images of a shooter and/or a target, and (b) an activating mechanism that determines whether to lock or unlock the firearm based on a result of the processing. The images can be captured by an image capturing device, e.g., a camera, mounted on a barrel of the firearm. In some embodiments, processing of an image includes comparing the images captured from a first camera (referred to as a "front camera") and a second camera (referred to as a "back camera") with a set of images available from an electronic storage media like microSD card or flash memory attached to the microprocessor.

For example, when a shooter points the firearm towards a target, then a front camera and the back camera of the firearm safety system capture images of the shooter and the target. A microprocessor of the firearm safety system which processes the images to determine whether to lock or unlock the firearm. In some embodiments, the storage media is loaded with the images of the authorized users and do-not-shoot targets.

In some embodiments, the microprocessor is configured to process all the images captured by the camera using software such as facial, image or Iris recognition. The microprocessor compares the captured images with images available in the storage media.

In some embodiments, if the image of the shooter does not match with the any of the images in the storage media, or the image of the target matches with any of the images in the storage media, the microprocessor generates a signal to lock the firearm. In some embodiments if the image of the shooter matches with any of the images in the storage media and the images of the target does not match with any of the images in the storage media, the microprocessor generates a signal to unlock the firearm.

In some embodiments, a night vision flashlight is coupled with the camera so the camera can capture a clear image of the shooter and target in low light condition.

A rechargeable power supply can supply the power to the microprocessor. The microprocessor is configured to indicate the low battery condition as well. The camera can be a still camera or a video camera. Further, the camera can be a 360-degree camera.

In some embodiments, the microprocessor is configured to use fingerprint or voice recognition to add an additional layer of security. The storage media also stores the images captured by the camera. The microprocessor can be configured to send a text message to a designated cell phone or an authority about the activation of the gun. The microprocessor can also process and detect the uniform of the military or police to protect them as a target. The microprocessor can also detect the images of the child and lock the firearm.

Environment

Figure 1:
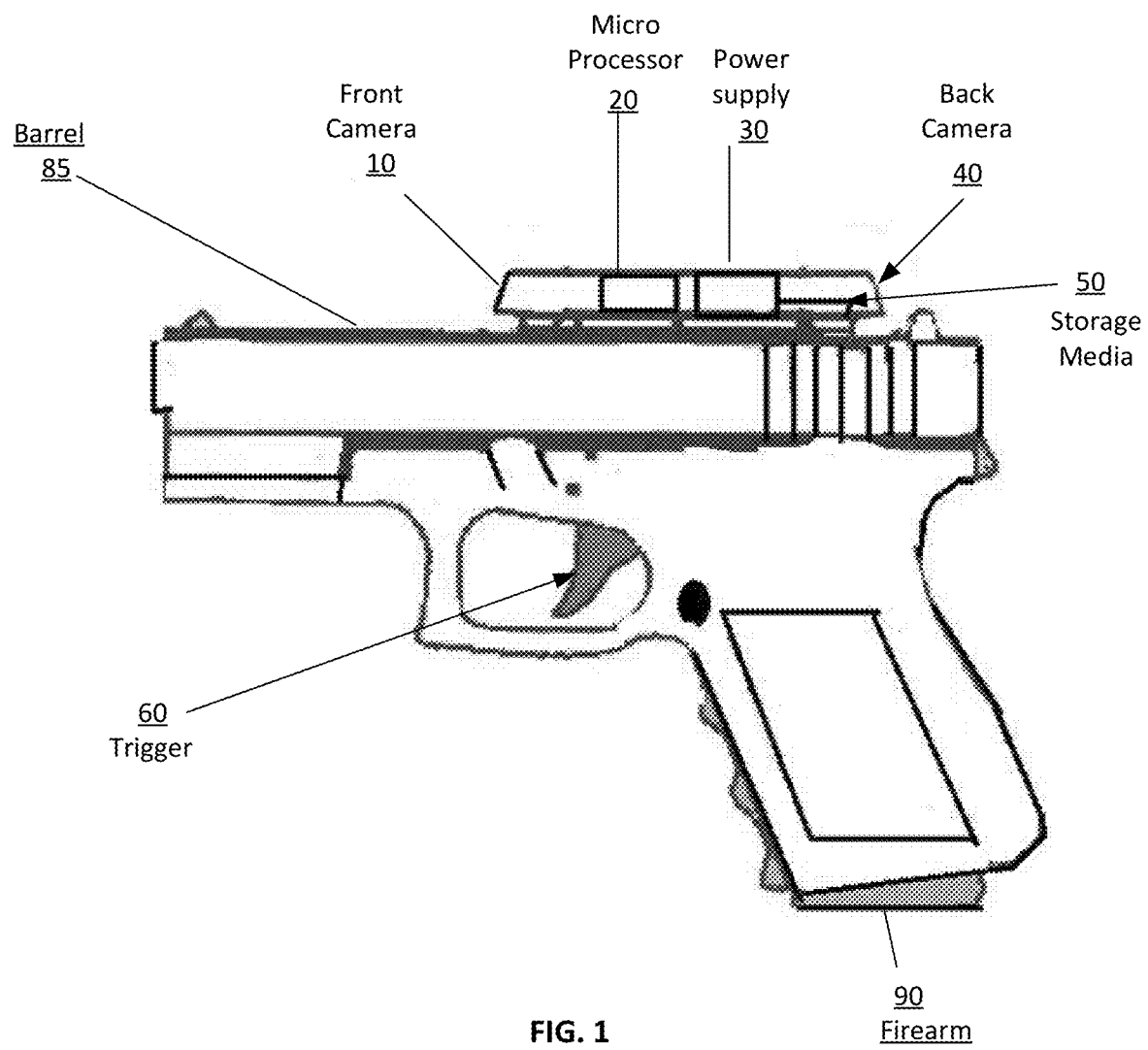
FIG. 1 illustrates a firearm safety system installed on a firearm, consistent with various embodiments.

FIG. 1 illustrates a firearm safety system installed on a firearm. The firearm safety system can be used to lock or unlock the firearm 90. The firearm safety system can include one or more of an image capturing device, e.g., one or more cameras such as front camera 10 and a back camera 40, a microprocessor 20, a power supply 30, and an electronic storage media 50. The firearm safety system can be installed on the firearm 90, e.g., on a barrel 85 of the firearm 90.

In some embodiments, the image capturing device captures the images of the shooter and the target. The image capturing device can include multiple cameras such as the front camera 10 and the back camera 40 or a single camera such as a 360-degree camera. The front camera 10 can be used to capture the images of a target and the back camera 40 can be used to capture the images of a shooter. The microprocessor 20 can process the images captured by the front camera 10 and the back camera 40. The power supply 30 supplies power to various components of the firearm safety system, e.g., the cameras and the microprocessor 20. In some embodiments, the power supply 30 is a rechargeable power supply. The electronic storage media 50 can store a set of images of do-not-shoot targets and authorized users of the firearm. Multiple images of the shooter and the target can be captured when the firearm 90 is pointed to the target. The captured images can then be stored in the storage media 50.

The microprocessor 20 processes the images captured by the image-capturing device, e.g., using facial or any other image recognition software. It compares all the pre-loaded images available in the storage media 50 with the captured shooter and target images. In some embodiments, the microprocessor 20 is programmed to process the voice recognition or biometric data of the shooter. A set of pre-loaded images are stored in the electronic storage media 50. The set of pre-loaded images can include a first group of images of authorized users of the firearm 90, e.g., authorized shooters, and a second group of images of people or targets who should not be shot at (referred to as "do-not-shoot" targets).

The microprocessor 20 compares the shooter image with the images of the authorized shooters and/or the target images with the images of the do-not-shoot target. The firearm 90 is locked, e.g., by an activating mechanism (not illustrated), when a shooter image does not match any of the pre-loaded images of authorized users of the firearm 90 or when the target image matches one or more of the pre-loaded "do-not-shoot" images. The firearm 90 is unlocked, e.g., by the activating mechanism, when the shooter image matches any of the pre-loaded images of the authorized users and the target image does not match any of the pre-loaded images of the "do-not-shoot" targets. Only when the two safety criteria are met, i.e., a recognized shooter and a non-recognized target is found, will the firearm 90 be enabled for firing. The microprocessor 20 can be also configured to send a notification to a user, e.g., a text message to a designated cell phone number or a number of an authority, if the firearm 90 unlocks the trigger 60.

In some embodiments, the microprocessor 20 is supplied with power by the power supply 30. The microprocessor 20 can also indicate a low battery condition if the remaining power in the power supply 30 goes below specified threshold. In some embodiment, the microprocessor 20 also stores the captured images in storage media 50 to keep evidence for the future as well as the past captured images.

The storage media 50 can be any external or in-built storage like MicroSD card or flash memory etc. The storage media 50 also gets power supply from the power supply 30 associated with the firearm 90.

Figure 2:
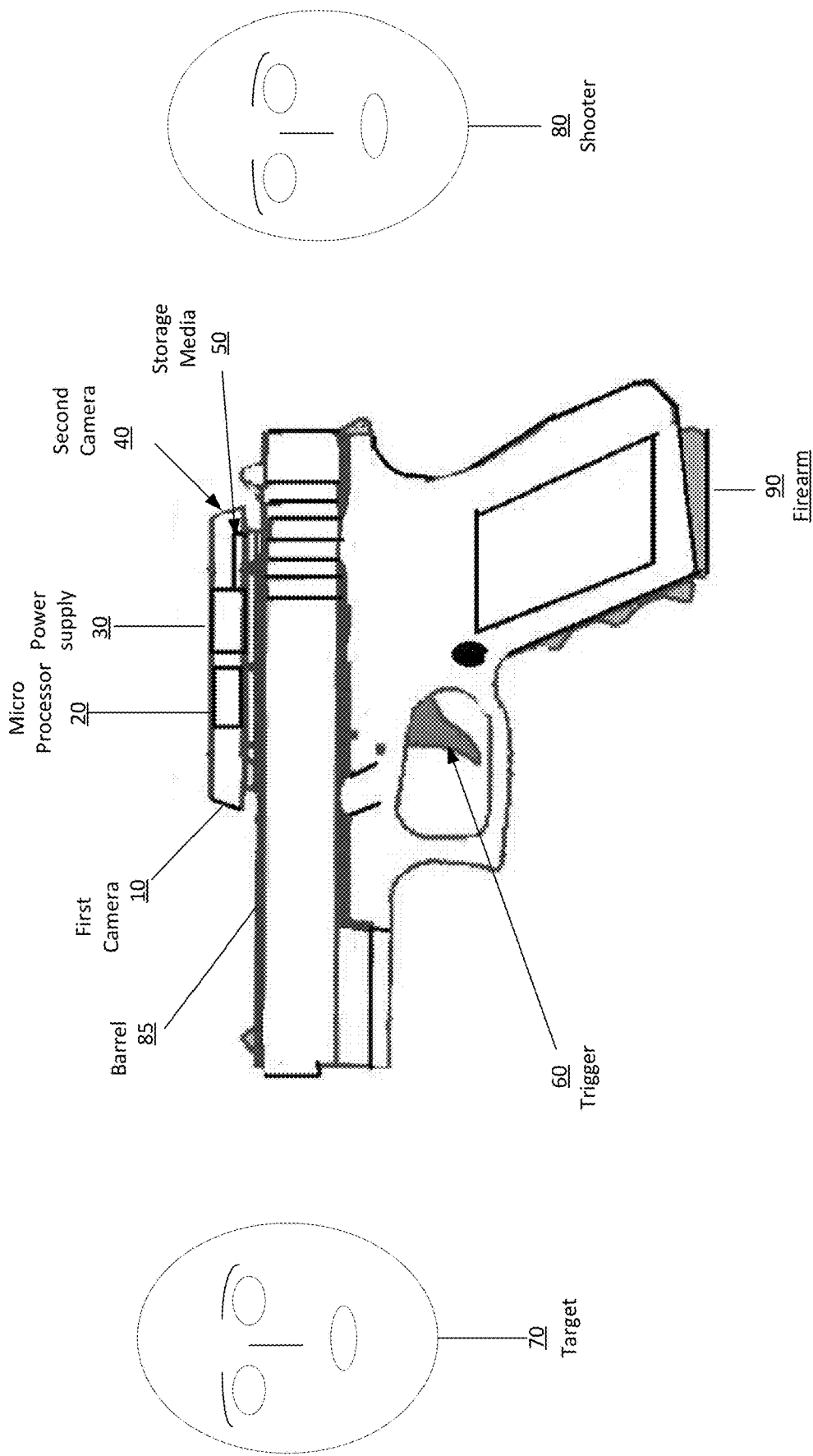
FIG. 2 illustrates a firearm pointed towards a target by a shooter, consistent with various embodiments.

FIG. 2 illustrates a firearm 90 pointed towards a target 70 by a shooter 80. For example, when a shooter 80 points the firearm towards a target 70, then a front camera 10 and the back camera 40 of the firearm safety system capture images of the shooter 80 and the target 70. A microprocessor 20 of the firearm safety system processes the images to determine whether to lock or unlock the firearm. The microprocessor 20 compares the shooter 80 image with the first group of images, and/or the target 70 images with the second group of images. The firearm 90 is locked when (a) the shooter 80 image does not match any of the pre-loaded images of authorized users of the firearm 90 or (b) the target 70 image matches one or more of the do-not-shoot targets. The firearm 90 is unlocked when (a) the shooter 80 image matches any of the pre-loaded images of the authorized users and (b) the target 70 image does not match any of the do-not-shoot targets. Only when the two safety criteria are met, i.e., a recognized shooter and a non-recognized target, will the firearm be enabled for firing. By locking the firearm in scenarios such as the one described above, the firearm safety system provides protection against accidental shooting. For example, an authorized shooter's child could not accidentally discharge the firearm 90. In another example, an authorized shooter, such as a policeman, could not accidentally shoot his/her child when the child sneaks into the house. The firearm safety system would serve as a safety tool not only to prevent accidental home shootings, but also to ensure greater safety for law enforcement personnel and the military, guarding against the scenario of their own firearm being used against them.

Figure 3:
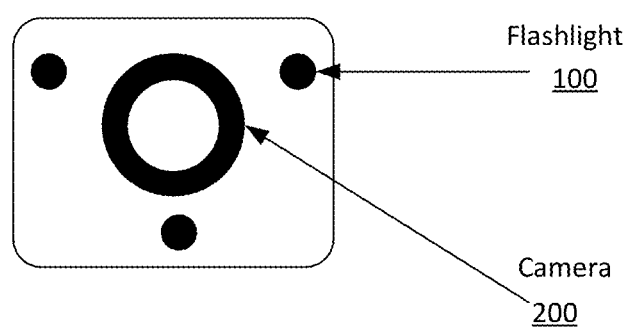
FIG. 3 illustrates an image capture device of the firearm safety system of FIG. 1 with night vision flashlight, consistent with various embodiments.

FIG. 3 illustrates an image capturing device of the firearm safety system of FIG. 1 with night vision flashlight, consistent with various embodiments. An image-capturing device 200 can include one or more cameras. One camera can be the front camera 10 which points towards the target 70 and captures the image of target 70, and a second camera can be the back camera 40 which captures the image of the shooter 80. The image capturing device 200 can also be a 360-degree camera, which can be used to capture the image of both the shooter and the target. A flashlight 100 is also attached with the camera like Ultraviolet (UV), InfraRed (IR), White Light, LED which can be activated facing both front and back to illuminate both target and shooter for identification purposes, and/or prevent target from easily seeing shooter.

Figure 4:
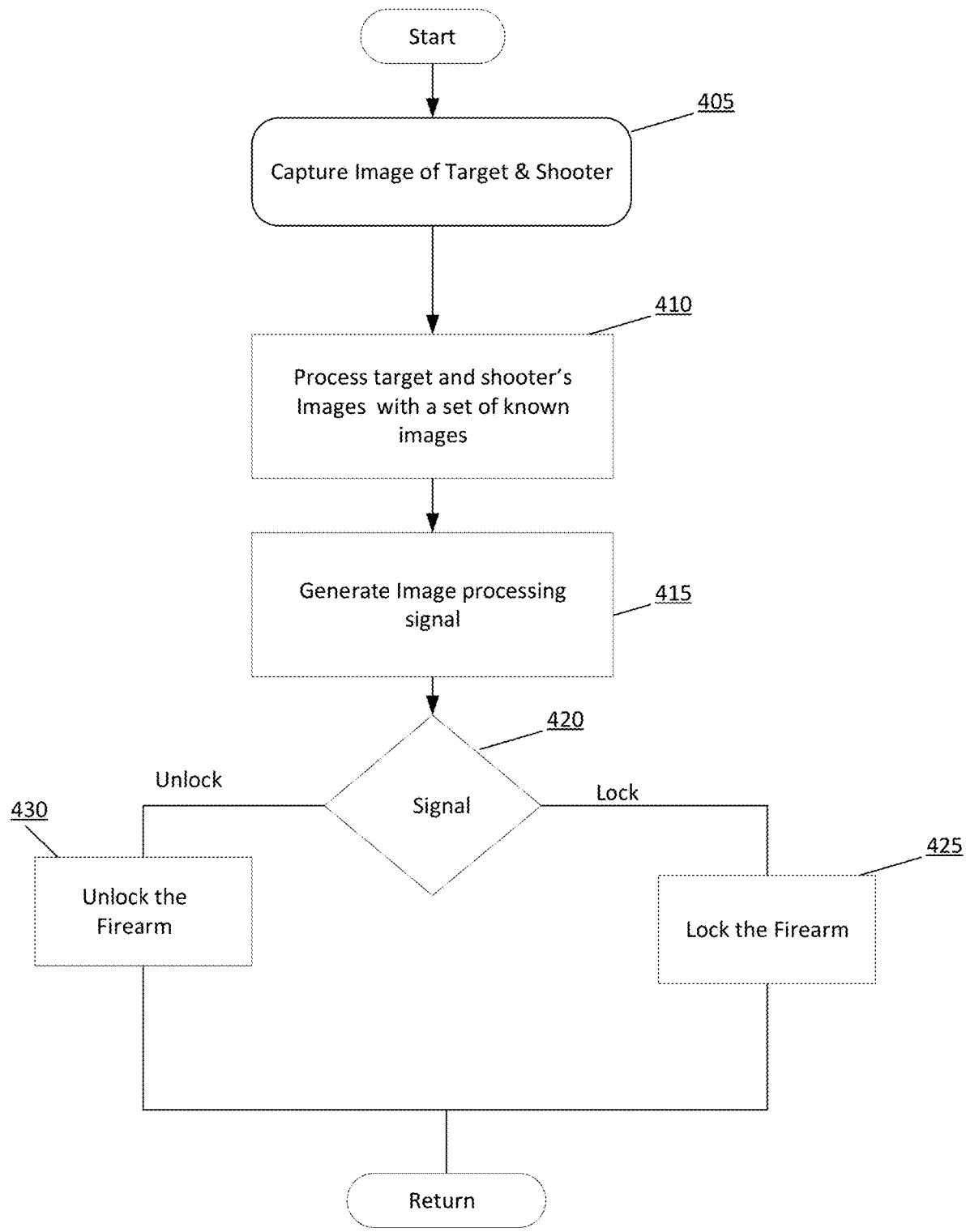
FIG. 4 is a flow diagram of a process of locking and unlocking of the firearm of FIG. 1, consistent with various embodiments.

FIG. 4 illustrates a block diagram of an example implementation of the firearm safety system consistent with various embodiments. At block 405, the image capturing device 200 captures the images of the shooter 80 and target 70. The image capturing device 200 can include one or more cameras, such as the front camera 10 and the back camera 40. In some embodiments, the image capturing device captures the images when the firearm 90 is pointed towards the target 70. After the images are captured, the shooter 80 and the target 70 images are provided to the microprocessor 20 for processing.

At block 410, the microprocessor 20 starts processing the shooter 80 and target 70 images. The microprocessor 20 compares the shooter 80 image with the images of the authorized shooters in the storage media 50 and/or the target 70 images with the images of the do-not-shoot targets.

At block 415, the microprocessor 20 generates a signal based on the image processing result and sends the signal to an activating mechanism of the firearm 90 to lock or unlock firearm.

At block 420, based on the signal value generated by the microprocessor 20, the activating mechanism determines whether to lock or unlock the firearm 90.

At block 425, the activating mechanism locks the firearm 90 when the shooter 80 image does not match any of the pre-loaded images of authorized users of the firearm 90 or a target 70 image matches one or more of the pre-loaded images of the do-not-shoot targets.

On the other hand, if the shooter 80 image matches any of the pre-loaded images of the authorized users and the target 70 image does not match any of the pre-loaded images of the do-not-shoot targets, at block 430, the activating mechanism unlocks the firearm 90. That is, the firearm 90 can now be used to shoot the target 70. Only when the two safety criteria are met, i.e. a recognized shooter and a non-recognized target, will the firearm 90 be enabled for firing.

Figure 5:
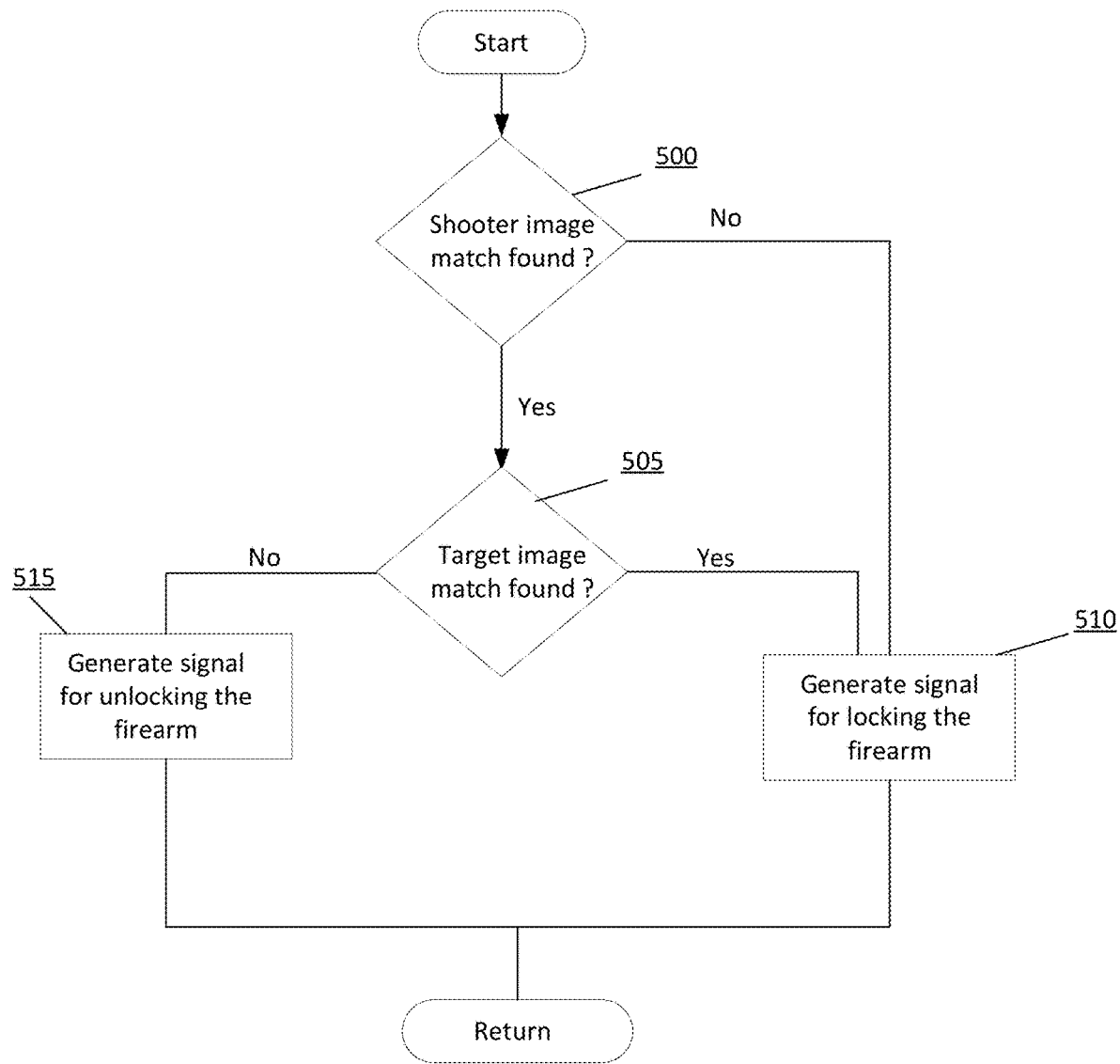
FIG. 5 is a flow diagram for processing an image to lock and unlock the firearm, consistent with various embodiments.

FIG. 5 illustrates a flow diagram of an example of processing the image to lock and unlock the firearm 90, by the microprocessor 20 consistent with various embodiments. In some embodiments, the process of FIG. 5 can be executed as part of block 415 of FIG. 4. At block 500, the microprocessor 20 determines if the captured shooter 80 image matches with any of the images of the authorized shooters in the electronic storage media 50. If a match is not found, at block 510, the microprocessor 20 generates a signal for locking the firearm 90.

On the other hand, if a match is found, at block 505, the microprocessor determines if the captured target 70 image matches any of the images of the do-not-shoot targets in the electronic storage media 50. If a match is found, at block 510, the microprocessor 20 generates a signal for locking the firearm 90. On the other hand, if a match is not found, that is, the target 70 is not one of the do-not-shoot targets, at block 515, the microprocessor 20 generates a signal for unlocking the firearm 90.

What is claimed is:

1. A firearm, comprising,
   a 360-degree camera for capturing a first image of a target and a first image of an user;
   a non-transitory memory for storing pre-loaded images, the first image of the target, and the first image of the user;
   the non-transitory memory for storing instructions; and
   one or more processors in communication with the non-transitory memory, wherein the one or more processors execute the instructions to:
      generate a signal to unlock the firearm based on a two-part determination that the first image of the target is not found within the pre-loaded images, and that the first image of the user is found within the pre-loaded images, or
      generate a signal to lock the firearm if either the first image of the target is found within the pre-loaded images, or the first image of the user is not found within the pre-loaded images.

2. The firearm as recited in claim 1, wherein the 360-degree camera is a digital video camera.

3. The firearm as recited in claim 1, wherein the two-part determination includes processing the first image of the target and the first image of the user and using facial recognition or iris recognition.

4. The firearm as recited in claim 3, wherein the one or more processors execute the instructions to perform the facial recognition by:
   extracting facial features of individuals in the first image of the target and the first image of the user, and
   comparing the facial features to facial features of those in the pre-loaded images.

5. The firearm as recited in claim 1 further comprising a power source that is configured to supply power to the processor.

6. The firearm as recited in claim 5, wherein the power source includes at least one rechargeable battery.

7. The firearm as recited in claim 1, wherein the memory stores a library of images having a plurality of targets and a plurality of shooters.

8. The firearm of claim 1, further comprising a night vision flashlight.

9. The firearm of claim 8, wherein the night vision flashlight is at least one of an ultraviolet light, an infrared light, a white light, or an LED light.

10. The firearm of claim 8, wherein the night vision flashlight is mounted pointing towards the front of the firearm.

11. The firearm of claim 8, wherein the night vision flashlight is mounted pointing towards the back of the firearm.

12. The firearm of claim 8, wherein the night vision flashlight is mounted pointing towards the front of the firearm, and a second night vision flashlight is mounted pointing towards the back of the firearm.

13. The firearm of claim 1, wherein the 360-degree camera is a still camera.

14. The firearm of claim 1, wherein the one or more processors execute the instructions to process voice recognition or biometric data of the user.

15. A method, comprising,
   capturing a first image of a target and a first image of an user using a 360-degree camera mounted on a firearm;
   storing pre-loaded images, the first image of the target, and the first image of the user in a memory;
   generating, using one or more processors in communication with the memory, a signal to unlock the firearm based on a two-part determination that the first image of the target is not found within the pre-loaded images, and that the first image of the user is found within the pre-loaded images, or generating a signal to lock the firearm, using the one or more processors, if either the first image of the target is found within the pre-loaded images or the first image of the user is not found within the pre-loaded images.

* * * * *